Nov. 24, 1964 H. E. FROEHLICH 3,158,123
UNDERSEAS VEHICLE
Original Filed Aug. 29, 1961 5 Sheets-Sheet 1

INVENTOR.
HAROLD E. FROEHLICH
BY *Harold D. Jastra*
ATTORNEY

Nov. 24, 1964   H. E. FROEHLICH   3,158,123
UNDERSEAS VEHICLE
Original Filed Aug. 29, 1961   5 Sheets-Sheet 2

INVENTOR.
HAROLD E. FROEHLICH
BY
ATTORNEY

Nov. 24, 1964    H. E. FROEHLICH    3,158,123
UNDERSEAS VEHICLE

Original Filed Aug. 29, 1961    5 Sheets-Sheet 3

INVENTOR.
HAROLD E. FROELICH

BY *Harold D. Jastram*

ATTORNEY

Nov. 24, 1964  H. E. FROEHLICH  3,158,123
UNDERSEAS VEHICLE

Original Filed Aug. 29, 1961  5 Sheets-Sheet 4

INVENTOR.
HAROLD E. FROEHLICH
BY Harold D. Jastram
ATTORNEY

Nov. 24, 1964
H. E. FROEHLICH
3,158,123
UNDERSEAS VEHICLE
Original Filed Aug. 29, 1961
5 Sheets—Sheet 5
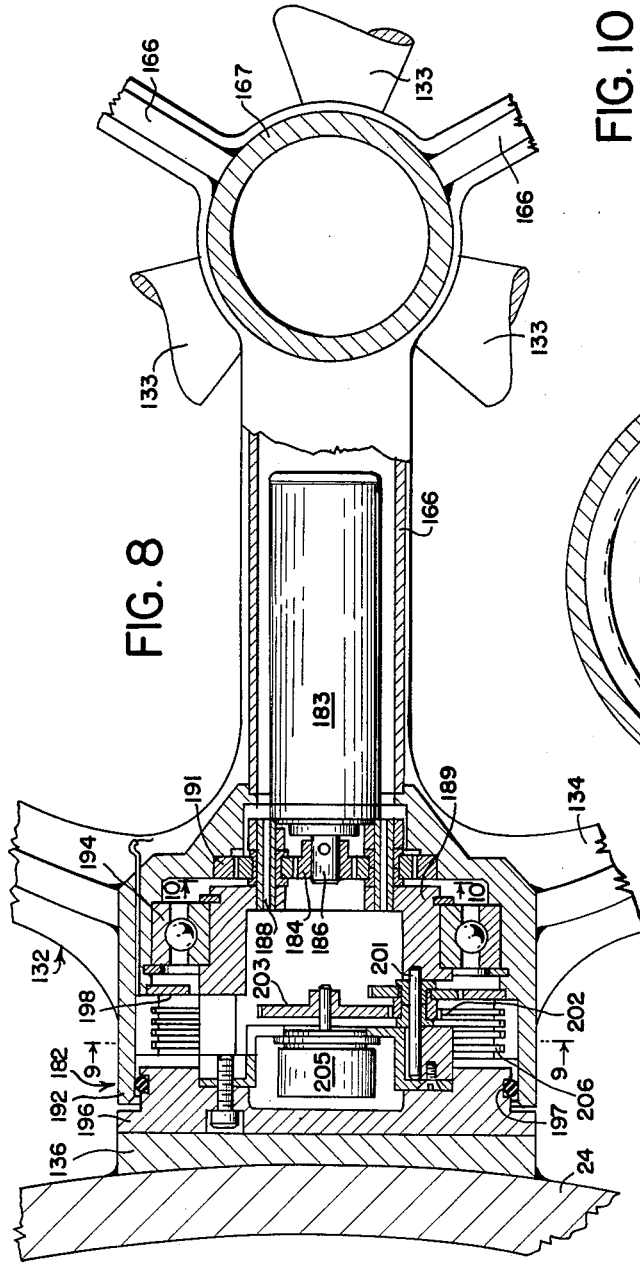
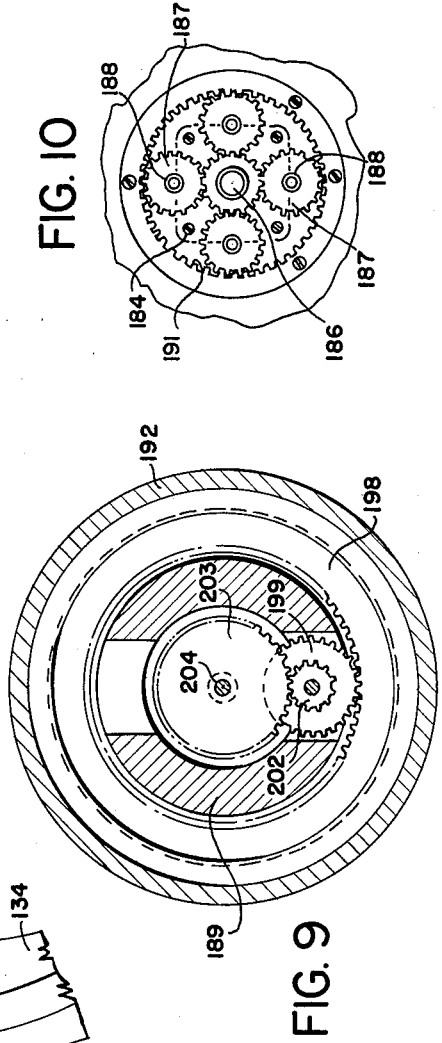
INVENTOR.
HAROLD E. FROEHLICH
BY Harold D. Jastram
ATTORNEY United States Patent Office
3,158,123
Patented Nov. 24, 1964

3,158,123
UNDERSEAS VEHICLE
Harold E. Froehlich, Minneapolis, Minn., assignor, by mesne assignments, to Litton Systems, Inc., Beverly Hills, Calif., a corporation of Maryland
Original application Aug. 29, 1961, Ser. No. 134,597. Divided and this application Mar. 27, 1963, Ser. No. 268,416
7 Claims. (Cl. 114—16)

This invention relates to a diving apparatus, and more particularly to a manned underwater vehicle for exploring the ocean floor independently of accompanying surface vehicles.

This application is a division of co-pending application Serial No. 134,597, filed August 29, 1961.

Exploration of the floor of a great body of water such as the ocean, takes place at great depths up to and exceeding 6,000 feet. A vehicle adapted to descend carrying a man to such great depths below the surface of a body of water, requires a number of special features. In the past such a special vehicle has been embodied in a craft which utilizes a spherically shaped, pressurized chamber to contain a human occupant in an atmosphere which approximates that near the surface of the ocean. A craft having a spherical chamber has been utilized and has usually been necessary since a spherical shaped body can be successfully constructed to withstand the great water pressure developed at considerable depths beneath the surface of the ocean. Such a craft is ordinarily lowered into the water from a research vehicle which acts as a support vehicle for the diving apparatus. The spherically shaped craft, however, due to its inherent design, has certain undesirable limitations such as the need for direct connection to a surface vehicle such as a research ship. Cables are normally used to connect the diving craft with the surface ship in order to control the movement of the diving craft. This direct connection with the surface vehicle normally places serious movement limitations on the underseas craft.

An object of the invention is to provide a new and improved diving apparatus.

Another object of the invention is to provide a diving apparatus having an efficient cabin structure for providing more usable space for a human occupant.

A further object of the invention is to provide an underseas vehicle which can be maneuvered at the bottom of the ocean independent of a surface vehicle.

A still further object of the present invention is to provide a manned underseas vehicle utilizing propulsion systems which maneuver the vehicle.

Another object of the present invention is to provide an underseas vehicle which utilizes balancing apparatus to balance the craft to enhance the maneuverability of the craft during operations at the bottom of the body of water.

A still further object of the present invention is to provide a submarine vehicle which utilizes tanks containing lifting fluid which have compensating apparatus to neutralize the water pressure on the surface of the vehicle while the vehicle is operating in great depths of water.

Another object of the present invention is to provide a submarine vehicle which utilizes a quickly detachable ballast and landing apparatus to insure quick ascent of the vehicle in the event of an emergency situation which may occur on the craft.

Another object of the present invention is to provide a manned submarine vehicle which utilizes a propulsion unit on the stern of the vehicle for maneuvering the vehicle and which utilizes other propulsion units to maneuver the vehicle vertically and horizontally to overcome drag, buoyancy, or a tendency of the vehicle to sink.

A vehicle forming a more specific embodiment of the invention may include a vehicle having a streamlined hull. The bow or nose of the vehicle is quite blunt and is formed by a hemisphere which forms part of a pressurized cabin of the vehicle. The remainder of the body of the vehicle tapers from the bow to form a pointed stern or tail portion where a maneuverable propulsion unit is mounted to propel and maneuver the vehicle. A second propulsion system utilized on the vehicle includes a pair of propellers located on either side and near the bow of the vehicle. These propellers are individually maneuverable and rotatable so that they can be used to maneuver the vehicle vertically as well as propel the vehicle in the forward and rearward directions independently of the stern propeller. Ballast and landing skis are attached to the vehicle by electromagnets so that in the event the vehicle must ascend rapidly, the electromagnets are utilized to rapidly discharge the ballast. The vehicle utilizes a bellows within the fluid tanks contained in the stern section of the vehicle for equalizing the fluid pressure on the walls of the vehicle.

A complete understanding of the invention may be obtained from the following detailed description of an underseas vehicle forming a specific embodiment, when read in conjunction with the drawings in which:

FIGURE 8 is a plan view partially in section of a propulsion assembly shown in FIGURES 2 and 3 and showing the mechanism which maneuvers the propulsion assembly;

FIGURE 9 is a sectional view taken along lines 9—9 of FIGURE 8 and showing a position indicating device; and FIGURE 10 is a sectional view taken along lines 10—10 of FIGURE 8 showing a planetary gear assembly.

Figure 1:
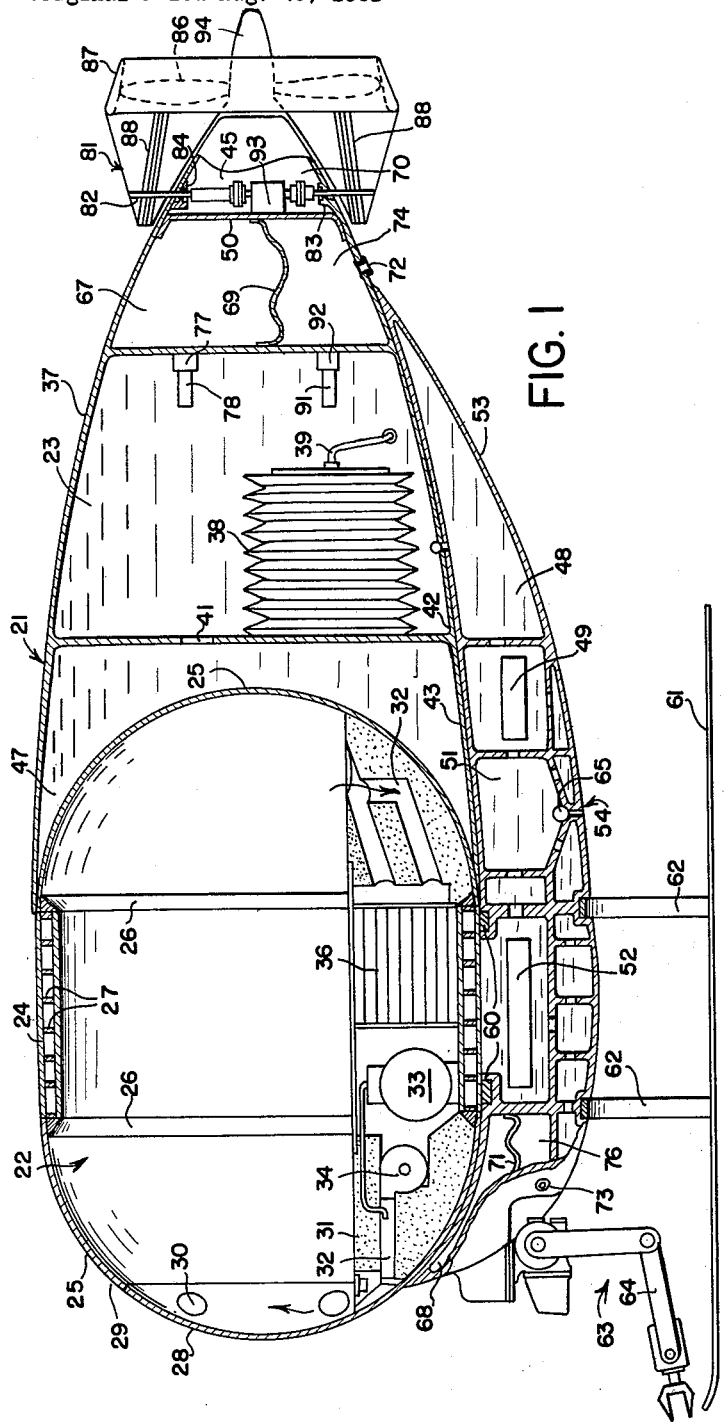
FIGURE 1 is a sectional elevation view of the vehicle showing the interior components of a submarine vehicle which forms a specific embodiment of the invention.

Referring first to FIGURE 1 of the drawings there is shown a cross-section of the vehicle. The vehicle has a generally streamlined hull or body 21 which is formed from a pressure chamber 22 and a liquid containing fluid chamber 23. The pressure chamber 22 is generally formed from a cylindrical portion 24 which is closed at either end by hemispheres 25. The walls of pressure chamber 22 are made of a high quality steel which is capable of withstanding high stressing forces. Pressure chamber 22 is shaped from a cylinder 24 and a pair of hemispheres 25 in order to provide a convenient work area for the occupants. The cylindrical shape provides a more useful working volume and permits occupants to assume a more natural and comfortable work position than is attainable in a spherical cabin.

This elongated pressure chamber 22 and tapered stern section is formed into a streamlined shape to reduce the fluid drag. The hemispheres 25 are joined to the cylinder 24 by seams 26. Cylinder 24 which is more subject to destruction by external fluid pressure contains reinforcing structure 27 in order to insure that the chamber 22 can withstand the hydrostatic stressing forces without buckling under the stresses which may exist as much as 6,000 feet below the surface of a body of water such as the ocean.

The pressure chamber 22 contains a hatch 28 through which occupants of the vehicle enter and exit from the pressure chamber 22. The hatch 28 is formed in the hemispherical portion of the pressure chamber 22 in order to overcome leakage and stress problems which are present if a similar hatch is placed in the cylindrical portion 24 of the chamber 22. Stressing forces present on the outer surfaces of the hatch 28 are transmitted along the curvature of the hatch 28 and are directed tangential to the curvature of the hemisphere 25 at the seam or juncture 29. Thus, these stressing forces help seal the hatch 28 into the walls of chamber 22 and eliminates bending stresses in the hull. The hatch 28 contains a number of observation ports 30 through which the operators of the vehicle can observe the movement of the vehicle, observe the operation of a manipulator 63, and observe marine life.

The interior of the pressure chamber 22 contains a floor 31 which is formed from a relatively rigid material such as wood or a plastic such as Styrofoam which has desirable characteristics. The floor contains circulation channels 32 to aid circulation of oxygen which is generated by an oxygen converter 33. A blower 34 forces air through the channels 32 so that the air flow continually circulates about the occupants of the pressure chamber 22. An absorption unit 36 is provided and mounted in the floor so that it intersects the path of the air flow through channels 32. The absorber 36 filters water vapor and carbon dioxide from the air to maintain a pressure chamber atmosphere which is suitable for human occupancy.

Fluid chamber 23 is filled with lifting fluid which can be discharged to aid the descent of the craft into the water. The fluid is discharged from chamber 23 by conventional means such as a pump system which is not shown. Fluid chamber 23 is connected to pressure chamber 22 to form a streamlined shape for the vehicle. The wall or skin 37 of the fluid chamber 23 is made of a light weight material such as fiber glass. The interior walls of the chamber 23 may be reinforced by ribs of material similar to that in the wall 37 or by some other relatively rigid material which will serve to support the wall 37.

The compressive forces acting on wall 37 are controlled by a bellows 38 which provides counter forces from within the container 23. A conduit 39 connects the bellows 38 with the outside surfaces of the vehicle and freely permits water to enter the bellows 38 or to exit from bellows 38 as the craft descends or ascends in a body of water. The compressive forces acting on the outside of wall 37 are opposed by equal forces developed in bellows 38 and transmitted through the lifting fluid from within the chamber 23. This bellows 38 thus provides the necessary compensating forces to overcome the compressive forces which are acting on the outer surface of wall 37. In a typical operation, suppose that the vehicle is descending into the sea. As lifting fluid is discharged from chamber 23, the vehicle begins to descend. The lifting fluid will shrink in volume due to increased pressure, lowered temperature and discharge of fluid. The water pressure on the outer surface of the wall 37 increases as the vehicle descends. In order to overcome the compression forces and in order to compensate for the change in volume, water freely flows into conduit 39 and into bellows 38. As the hydrostatic compression forces on wall 37 tend to compress the lifting fluid and consequently the bellows 38, water at equal hydrostatic pressure enters the bellows 38 through conduit 39 and produces an opposing force within the bellows 38 to force the lifting fluid against the wall 37 in a direction opposite the direction of the compression force exerted on the outer surface. Since the water entering bellows 38 is at the same pressure as the water which produces the external compression force, the resultant force across wall 37 is zero. Thus it is obvious that a wall material such as fiber glass may be used to form the wall 37 of fluid chamber 23.

Figure 3:
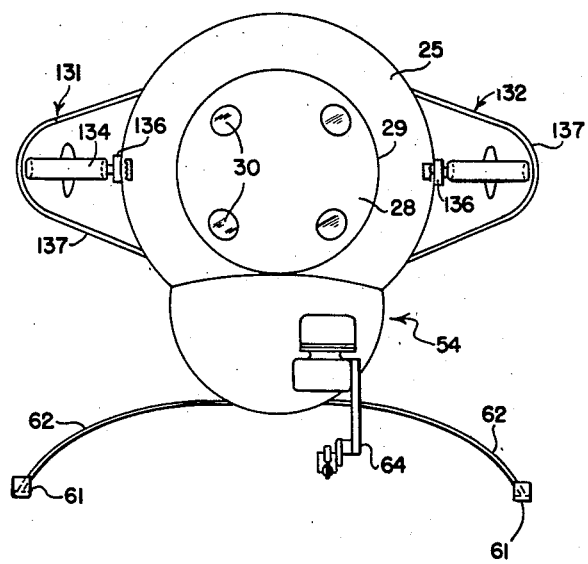
FIGURE 3 is a front view of the vehicle shown in FIGURES 1 and 2 showing a pair of maneuverable propulsion units and the bow section of the vehicle.

Walls 41, 42, 43, 45, of chambers 47, 48, 49, 50, and 51 respectively are similar to chamber 23. Since each of the walls 41, 42, 43, and 45 is formed from fiber glass material, the fluid forces which are developed in chamber 23 by bellows 38 are freely transmitted across these walls to the associated chambers and consequently the force compensation which is achieved across wall 37 of chamber 23 is also achieved across wall 53 which forms a pod 54 attached to the bottom side of the vehicle (see FIGURES 1 and 3). Also the various chambers have openings to permit lifting fluid to flow freely from chamber to chamber. Some of the openings are shown in FIGURE 1.

Pod or carrier 54 is attached to the bottom of the vehicle to carry ballast, batteries, and lifting fluid. The pod 54 contains a battery chamber 52 which is a fluid filled chamber containing the same fluid as the lifting fluid contained in chamber 23. The batteries are utilized to power the various propulsion units of the vessel as well as for providing power for air circulation and instrument sensing. No connections and no batteries have been shown since conventional methods of distributing D.C. power from these battery sources are used. The pod 54 is attached to the steel pressure chamber 22 by electromagnets 60 which are energized by the battery power supply. These magnets 60 provide a means of rapidly detaching the pod 54 and associated structure from the vehicle in the event a rapid ascent is necessary.

Ballast container 51 carries small steel pellets which provide ballast to aid descent of the vessel into the water. When the vehicle must ascend, the steel pellets in ballast chamber 51 are discharged through opening 65 to make the vehicle more buoyant and aid ascent of the vehicle to the surface of the water.

A pair of skis 61 is mounted on the pod 54 by spring struts 62. These skis 61 provide support for the vehicle in the event the operators wish to set the craft on the floor of the ocean. The struts 62 are molded into the fiber glass material of the pod 54.

At the front of the pod 54 is a mechanical manipulator 63. Manipulator 63 is mounted on the pod 54 and is controlled from within the pressure chamber by controls which are not shown. The manipulator 63 may be a manipulator such as the General Mills' Model 150 Manipulator which is manufactured by General Mills, Incorporated. The manipulator is composed of several linkages 64 with a grasping type member 66 at the end of the linkage 64 used for maneuvering and grasping objects which are encountered.

Longitudinal balancing of the vehicle is in part accomplished by utilizing a pair of tanks which contain lifting fluid. A first of these tanks, tank 67, forms a part of body portion 21 of the vehicle and is located near the stern of the vehicle. The other container is located in pod 54 near the bow of the vehicle and is designated as tank 68. The lifting fluid is contained by a diaphragm 69 and 71 in tanks 67 and 68 respectively. Openings 72 and 73 of tanks 67 and 68 respectively communicate with the surrounding body of water and admit water into cavities 74 and 76 respectively. When the water enters the openings, it forces the diaphragms 69 and 71 to compress the lifting fluid in each of the tanks and consequently acts in a manner similar to the bellows 38 which is located in chamber 23, thus compensation for compressive forces across the walls of tanks 67 and 68 is accomplished. However, the main function of the diaphragms 69 and 71 is to distribute the lifting fluid contained in tanks 67 and 68 in order to alter the pitch of the vehicle by redistributing the lifting fluid. A hydraulic pump and interconnected conduits are used to force lifting fluid from tanks 67 to 68 or vise versa in order to redistribute the lift of the vehicle. A fluid pump 77 for accomplishing this redistribution is shown mounted in fluid chamber 23. Fluid pump 77 is operated by an electric motor 78 which is powered by the batteries carried in pod 54. If the craft must be tilted so that the bow of the vehicle is pitched down, pump 77 is used to pump lifting fluid from tank 68 into tank 67. Sea water is admitted into cavity 76 through opening 73 as lifting fluid is discharged from tank 68 and sea water is ejected from cavity 74 as lifting fluid from tank 68 is forced into tank 67 to displace the sea water contained in cavity 74. The discharge of sea water from cavity 74 changes the resultant lift of the stern section of the vehicle, consequently, the stern will rise above the bow and tip the vehicle. As described, the structure herein provides a life saving arrangement wherein the separable battery carrier portion is released and the bow and stern portion then floats upwardly to the water surface. The conduit connecting pump 77 with chamber 68 is expendable and breaks or tears loose at either the pump 77 or chamber 68, upon release of the magnet holding means for dropping the carrier portion, as herein described.

Forward propulsion of the vehicle is accomplished primarily by propulsion assembly 81 which is attached to the stern of the vehicle. The assembly 81 is pivotally mounted on the stern by a shaft 82 which is mounted for rotation on bearings 83 and 84. The bearings 83 and 84 are mounted on a support member 70 which carries the weight of the assembly 81. The entire assembly 81 is pivoted about the shaft 82 in order to redirect the thrust of propeller 86 to maneuver the vehicle in the horizontal plane of the vehicle. A nozzle 87 is utilized to shroud propeller 86 for at least two reasons. First, since the vehicle is to be operated at relatively slow speeds, 8 knots or less, a nozzle or shroud 87 provides an efficient means of utilizing energy which is generated in the wake of the vehicle. Additionally, the nozzle or shroud 87 provides the only stabilizing surfaces which are necessary for the vehicle. In other words, the nozzle or shroud 87 eliminates the need for tail fins since it provides the necessary stabilization to overcome pitch and a tendency of the craft to yaw. Since the nozzle 87 is in close proximity with the propelling forces, propeller 86, there is an assurance that fluid will be forced past the stabilizing nozzle 87 consequently, relatively efficient stabilization is attained.

The entire stern propulsion assembly 81 is mounted on shaft 82 by member 88 which is connected to struts 89. Assembly 81 is pivoted about shaft 82 by a hydraulic actuator 93 or similar device. A D.C. electric motor 91 operates hydraulic pump 92 which in turn provides the high pressure fluid necessary to operate the torque actuator 93 such as the Rotac unit manufactured by Ex-Cell-O Corporation, Greenville, Iowa. A suitable indicating meter not shown is used by the operator of the vehicle to determine the polar location of the propulsion assembly 81. The direction of travel of the vehicle is changed by energizing motor 91 which operates pump 92 to force fluid into torque actuator 93 to pivot the assembly 81. The exact polar positioning of the assembly 81 is indicated at all times on meters mounted in pressure chamber 22 which are not shown.

Figure 4:
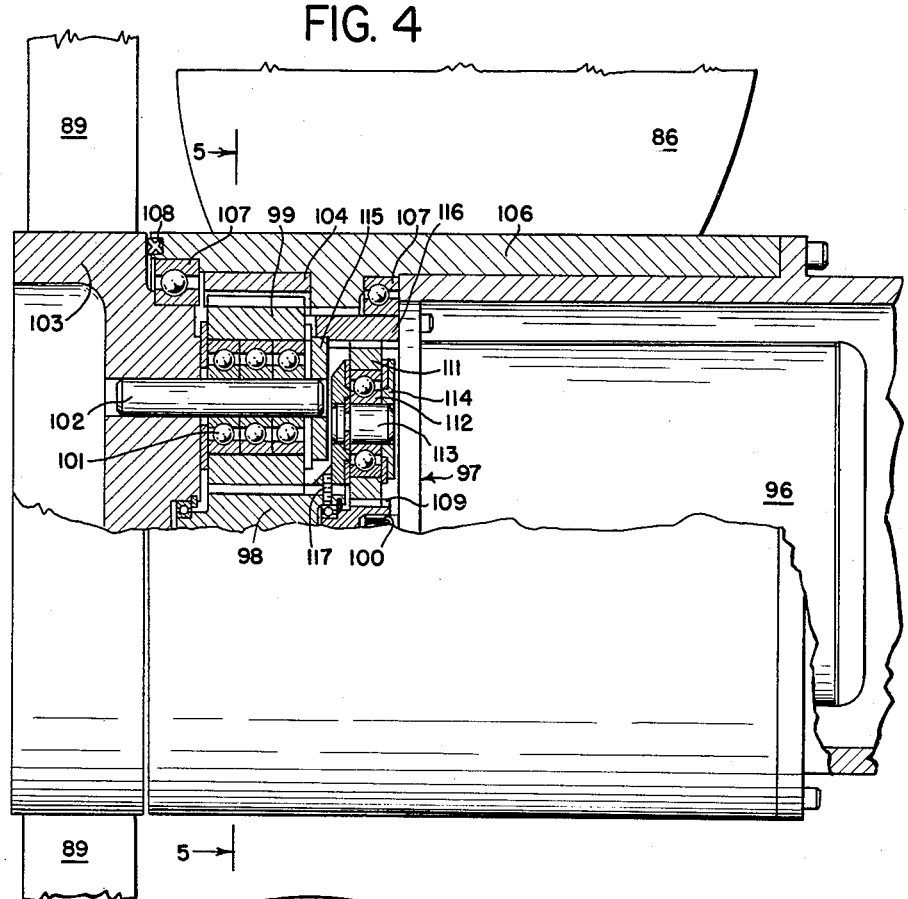
FIGURE 4 is a fragmentary sectional view of a stern propulsion assembly for the vehicle illustrated in FIGURE 1.
Figure 5:
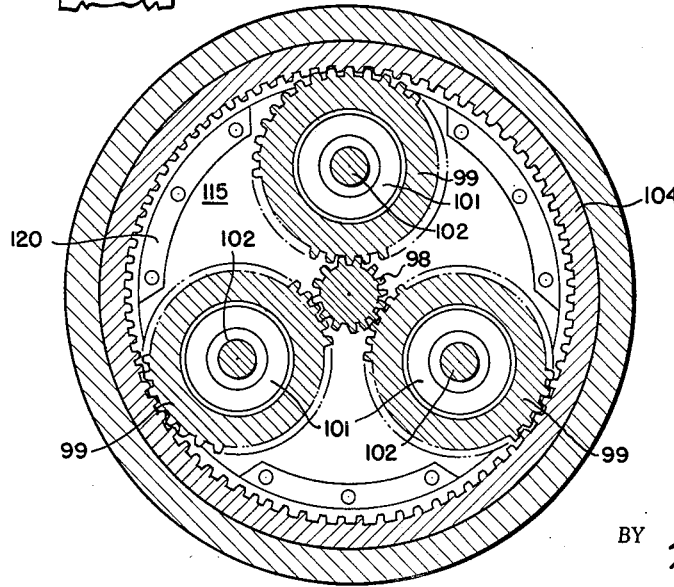
FIGURE 5 is a sectional view taken along lines 5—5 of a planetary gear system shown in FIGURE 4.

The power source for propeller 86 is contained in motor casing 94 (see FIGURES 4 and 5). Propeller 86 is driven by a reversible D.C. motor 96 which is mounted in motor casing 94. Motor 96 is energized by the battery supply which is located in pod 54 and is connected to that source by suitable electrical connectors which are not shown. Motor 96 drives propeller 86 through a planetary gear system generally designated by numeral 97. A sun gear 109 (see FIGURE 4) is connected to the shaft 100 of motor 96. Sun gear 109 (see FIGURE 4) is connected ot the shaft 100 of motor 96. Sun gear 109 engages planetary gears 111. Planetary gears 111 are mounted on ball bearings or other suitable bearings 112 which are secured to shafts 113. Shafts 113 are rigidly connected to cage 114. Each planetary gear 111 engages a stationary ring gear 116 so that as the motor 96 drives sun gear 109, cage 114 which is connected to pinion 98 by pin 117 also rotates and drives sun gear 98. Pinion 98 engages three spur gears 99. Spur gears 99 are mounted on ball bearings or other suitable bearings 101 which are secured to shaft 102. Shaft 102 is rigidly connected to housing 103 which in turn is connected to struts 89. The other end of shaft 102 is connected to stationary member 115 which engages member 116 and is connected to housing 103 by bolts which pass through a flange 120 (see FIGURE 5). Thus it can be seen that strut 89, housing 103, shaft 102 are interconnected and are stationary members. Spur gears 99 engage ring gear 104. Ring gear 104 is mounted within hub 106 which in turn is mounted on bearings 107 so that the hub 106 and ring gear 104 rotate about the remainder of the gear system. A suitable water seal 108 interconnects hub 106 and housing 103 to prevent water from leaking into the gear system 97. Propeller 86 is connected to and driven on rotary hub 106. When motor 96 drives pinion 109 the sun gear 98 is driven by cage 114. Spur gears 99 are fixed and rotate on shafts 102. Rotating spur gears 99 engage and drive the ring gear 104 thus transmitting power from motor 96 through the gear system to the hub 106 to drive propeller 86.

Figure 2:
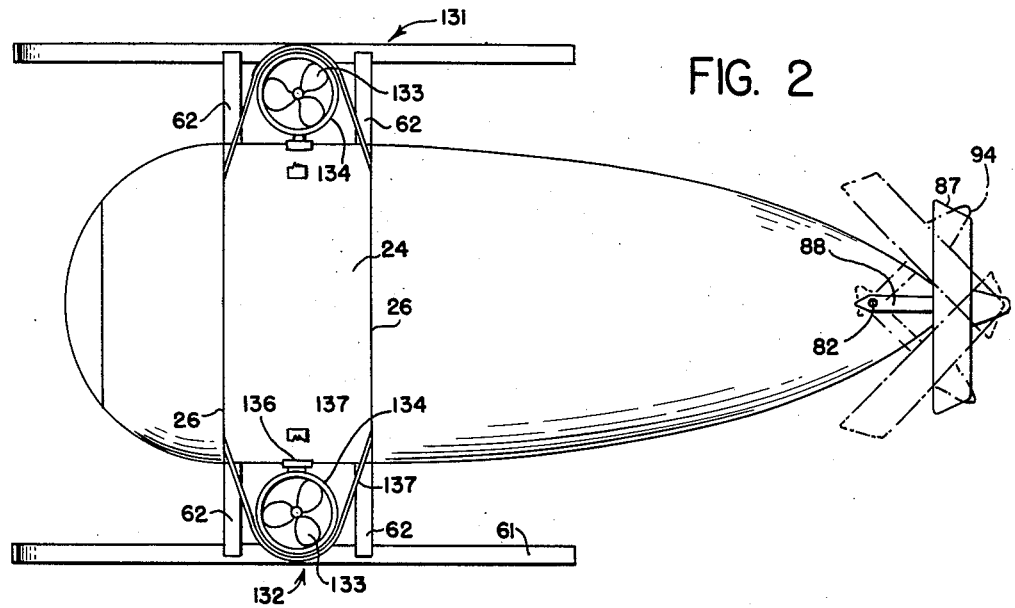
FIGURE 2 is a plan view of the vehicle shown in FIGURE 1.
Figure 6:
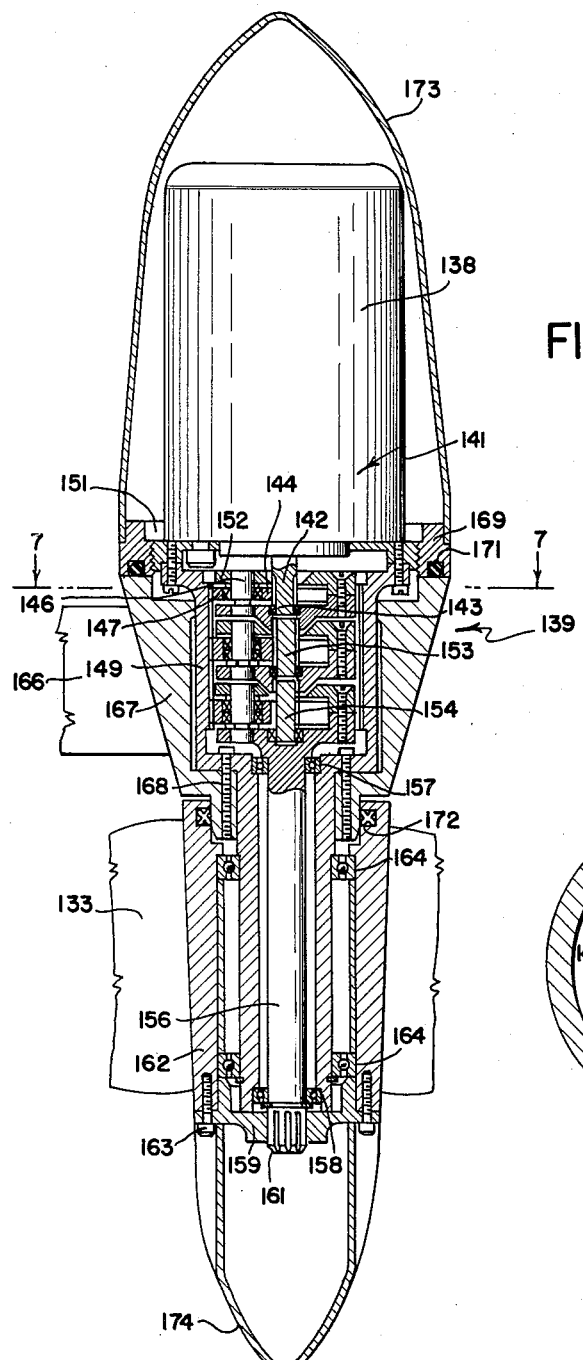
FIGURE 6 is a cross section of a propulsion unit shown in FIGURES 2 and 3 and illustrating a drive motor planetary gear system and hub arrangement of the propulsion unit.
Figure 7:
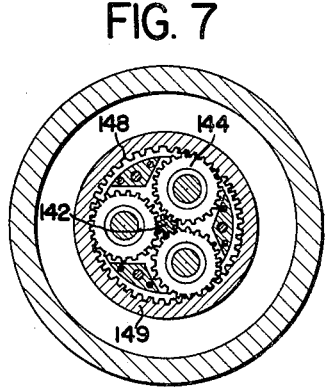
FIGURE 7 is a sectional taken along lines 7—7 of FIGURE 6.

A pair of propulsion units similar to the stern propulsion unit is used for the purpose of maneuvering the vehicle. Propulsion units 131 and 132 are mounted on chamber 24 at port and starboard of the vehicle as shown in FIGURE 2. Each unit 131 and 132 has a propeller 133 and a nozzle or shroud 134 similar to the propeller 86 and nozzle 87 of the tail assembly 81. Explanation of the propulsion units 131 and 132 will be simplified by merely explaining the operation of a single unit since both units are identical except that the separate units are mounted at starboard and port of the craft. Consider unit 132. The unit is mounted on the cylindrical portion 24 of pressure chamber 22 by a mount 136. Guards 137 are provided for the unit in order to prevent foreign objects from entering the propeller blades 133. The propeller and power units are interconnected in a manner quite similar to that utilized for the stern assembly 81. Referring to FIGURE 6 there is shown a view of a motor 138, drive unit 139, and propeller 133. The drive unit 139 utilizes a series of planetary gear systems 141 which are connected in cascade to provide the necessary gear ratio to drive propeller 133. This planetary system permits the use of a small high speed motor 138 which can be conveniently streamlined. A first of the planetary systems is connected to shaft 142 of motor 138 (see FIGURE 7). Shaft 142 may either be a shaft with a sun gear mounted on the shaft 142 or the shaft may have gear teeth cut into the periphery of the shaft which ever is more convenient. In the particular case shown the gear teeth are cut into the shaft 142 and the shaft operates as the sun gear for the planetary system. Shaft 142 is mounted for rotation on bearing 143 and engages three (3) planetary gears 144 which in turn are mounted for rotation on shafts 146 by bearings 147. Planetary gears 144 engage a ring gear 148 which is part of a stationary sleeve 149. Stationary sleeve 149 is rigidly connected by threaded member 151 and connecting bolts to motor 138 (see FIGURE 6). When shaft 142 is driven by the motor, the planetary gears 144 are rotated about shafts 146. Since shafts 146 are rigidly mounted to cage 152, and since sleeve 149 is stationary, the cage 152 will rotate about the axes of motor shaft 142 carrying the planetary gears 144. Cage 152 is connected to shaft 153. Power is transmitted from shaft 142 of the motor 138 through the first planetary system to shaft 153 of the second planetary system. The second planetary system operates exactly as the first planetary system and transmits power to shaft 154 of the third cascaded planetary system. Note that since all of the planetary systems operate in the same manner, a detailed description of each is avoided.

The last planetary system which is mounted on shaft 154 rotates shaft 156. Shaft 156 is mounted within sleeve 149 on bearings 157 and 158. A plate 159 is connected to the slotted end 161 of shaft 156 so that as shaft 156 is driven by the cascaded planetary systems, the plate 159 is rotated. A hub 162 is rigidly connected by bolt 163 to rotated plate 159. The hub 162 and plate 159 are mounted for rotation about the outer surface of stationary sleeve 149 by bearings 164. The propellers 133 of the propulsion unit 132 are rigidly connected and driven on hub 162.

The entire assembly 139 is mounted on struts 166 which support a nozzle 134. Struts 166 are connected to assembly 139 by ring 167 which is in turn rigidly connected to stationary sleeve 149 by bolt 168 and is in turn rigidly connected to motor 138 by use of threaded member 151 and ring 169 (see FIGURE 6). Sealing materials 171 and 172 are provided at the various joints in order to prevent water from entering the assembly 139. Motor 138 is covered by a casing 173 which provides protection from the sea water and in addition makes the entire assembly 139 more streamlined. Casing 174 is similar to casing 173 and serves the same purpose.

Power is provided to motor 138 from the batteries which are housed in chambers 49 and 52 of the pod 54. The motor 138 and the batteries are interconnected by electrical connectors which are not shown and are controlled from within the pressure chamber 22 by conventional indicating circuits which are also not shown.

The propulsion units 131, and 132 provided for this craft are rotatable for 360° about an axis normal to the longitudinal axis of the vehicles. (See FIGURE 8). Each of the units 131 and 132 is independently controlled and has independent motors 138 for operating the propellers 133. Consequently, the units 131 and 132 may be independently maneuvered to direct the thrust of the propellers 133 in such a manner that the vehicle can be manuevered vertically and horizontally in the water. As an example, if the propulsion unit 132 is rotated so that the thrust from the propeller 133 is directed to the stern of the vehicle and if the thrust of propeller 133 of unit 131 is directed to the bow of the vehicle, the vehicle will pivot about an axis through its center without the aid of the stern propulsion unit 81. Additionally, if both propulsion units 131 and 132 have the thrust of propellers 133 directed downwardly as viewed in FIGURE 3, the vehicle will rise above the ocean floor or if the proper propeller speed is attained the craft will hover above an object or the floor of the ocean. The propulsion units 131 and 132 can be used to propel the craft forwardly or to the rear without the aid of the stern propulsion unit 81. Additionally, the units can be used to force the vehicle to descend as well as ascend independently of the other controls on the vehicle. Thus it can be seen that the independent 360° rotatable capability of the propulsion units 131 and 132 provide a means for maneuvering as well as propelling the craft.

The assembly 182 which furnishes the capability of redirecting the thrust of each of the propulsion units 131 and 132 is illustrated in FIGURE 8. As with the power unit 139 an explanation of the unit 182 in connection with propulsion unit 132 is adequate to cover an identical unit utilized on propulsion unit 131. FIGURES 8, 9 and 10 show a mount 136 which connects the propulsion unit 132 to the cylindrical portion 24 of the craft. A reversible D.C. motor 183 is used to power the rotary unit 182. A spur gear 184 is connected to shaft 186 of motor 183. Spur gears 187 are driven by gear 184. Spur gears 187 are mounted on shafts 188 which are mounted in a housing 189. When the motor 183 is energized, gear 184 is driven and power is transmitted through spur gears 187 which engage a ring gear 191 and which forms part of hub 192. Hub 192 is mounted for rotation about housing 189 on bearing 194. Nozzle 134, struts 166, and propeller 133 are mounted on hub 192 so that as hub 192 is driven by the planetary system just described, the entire unit is rotated about the axis normal to the longitudinal axis of the vehicle and the thrust of propellers 133 is redirected. Hub 192 is conected to mount 136 by a plate 196 which contains a seal 197 to prevent water from entering the interior of hub 192. Plate 196 and housing 189 are rigidly interconected so that as mentioned before, shaft 188 remains stationary so that gears 187 remain in place and drive ring gear 191 to rotate hub 192.

The polar positioning of the propulsion unit 132 is determined by instruments which are contained within the pressure chamber 22 but which are not shown. FIGURE 9 is a cross sectional view of a potentiometer system utilized to sense the polar positioning of the propulsion unit 132. As the propulsion unit 132 is rotated, a ring gear 198 is also driven and engages gear 199 which is mounted on a fixed shaft 201. Gear 199 is rigidly connected to a spur gear 202 which engages a larger spur gear 203. Spur gear 203 is connected to the wiper shaft 204 of a potentiometer 205. Thus, as the propulsion assembly 132 is rotated, the positioning of the assembly is indicated on the potentiometer 205 and a voltage which is indicative of the polar position of the propulsion assembly 132 is transmitted to the control instruments which are mounted within the pressure chamber 22. The operator of the vehicle can determine at any time the exact polar position of these propulsion units 131 and 132 by simply observing the appropriate instrument. Power is transmitted to motor 183 by slip ring assembly 206.

Motor 183 is mounted within one of the struts 166 of the propulsion assembly 132 in order to provide a more compact assembly and in order to protect the motor 183 from water which may damage or impair the operation of the motor.

Each of the drive assemblies the stern assembly 81, the maneuvering units 131 and 132, and the assembly 182 is interconnected with fluid container 23 by conduits which are not shown. The driving assemblies are flooded with lifting fluid, some type of oil, and communicate with container 23 so that the force equalization which is accomplished across wall 37 is also provided for the housings of these assemblies. Force compensation eliminates the need for massive housing structures in these assemblies and reduces the problems of sealing various moving parts. It might also be noted that commutation difficulties which are encountered when a D.C. motor is surrounded by fluid such as lifting fluid were overcome by using porous brushes. These brushes reduce the tendency of the brushes to disengage the commutator when fluid pressure builds up between the commutator and the brush.

It is to be understood that the above described arrangements are simply illustrative of the application of the principles of invention. Numerous other arrangements may be devised by those skilled in the art which will embody the principles of the invention and which fall within the spirit and scope thereof.

Now therefore, I claim:

1. A diving and deep sea floor exploring underwater vehicle operable independently of surface vehicles consisting of a pressure chamber bow portion, a lifting fluid containing stern portion and a separable fluid ballast and battery carrier portion, said pressure chamber bow portion, stern portion and carrier portion comprising a streamlined body wherein the said bow portion has a reinforced cylindrical body portion closed at either end by hemisphere portions and capable of withstand high hydrostatic stressing forces, said stern portion being formed of lighter material and incapable of withstanding the high hydrostatic stressing forces of said bow portion and comprising a fluid chamber adapted to be filled with lifting fluid which can be discharged to aid in descent of the said vehicle, reinforcing rib means in said stern portion, a bellows means in said stern portion, conduit means connecting the interior of said bellows means with the outside surface of said stern portion and adapted to freely permit sea water to enter into and exit from said bellows and equalize the internal and external pressures on said stern portion and said carrier portion through the medium of said lifting fluid contained therein, said separable carrier portion comprising a series of chambers including a battery chamber, a ballast chamber and lifting fluid chamber having interconnected fluid passageways, magnet holding and battery circuit means attaching said separable carrier portion to said bow portion, a plurality of independent motor and propelling means for moving said vehicle, and control means operable from within said bow portion for operating each of said motor and propelling means and additional control means for breaking said circuit to said magnet holding means.

2. The structure of claim 1, wherein said propelling means comprises in combination a main stern motor and vehicle driving propeller assembly mounted on said stern portion and horizontally pivotable through about a 140° angle lying in the horizontal plane of said vehicle, independently operable motor and vehicle maneuvering and propeller assemblies mounted on the port and starboard sides of the cylindrical portion of said bow portion and each rotationally pivotal through an angle of 360° about an axis normal to the longitudinal axis of said vehicle, and independent control means for each said motor and propeller assembly.

3. The structure of claim 1 including a mechanical manipulator mounted on the said carrier.

4. The structure of claim 1 including ski means mounted on said carrier portion for supporting said vehicle on the ocean bottom and separable therewith when said carrier portion is released from said bow portions.

5. The structure of claim 1 including in said bow portion a floor portion, oxygen circulating channels in said floor portion opening into said bow portion, and oxygen supply means and absorber means mounted in said floor portion and said circulating channels.

6. The structure of claim 1, including a balancing tank mounted in said stern portion, a separable balancing tank mounted in said carrier portion, and pump and interconnecting conduit means for transferring lifting-fluid between said tanks.

7. The structure of claim 2 including stabilizing nozzle means about each said propeller assembly, and potentiometer means for indicating the polar position of each said port and starboard motor and propeller assembly.

References Cited in the file of this patent

UNITED STATES PATENTS

| 1,067,371 | Peacock | July 15, 1913 |
| 1,352,922 | Sprague | Sept. 14, 1920 |
| 2,347,785 | Lovell | May 2, 1944 |
| 2,720,367 | Doolittle | Oct. 11, 1955 |
| 2,981,074 | Wilder | Apr. 25, 1961 |
| 3,056,374 | Linhardt | Oct. 2, 1962 |
| 3,063,395 | Brown | Nov. 13, 1962 |
| 3,102,504 | Sato | Sept. 3, 1963 |
| 3,103,195 | Cousteau | Sept. 10, 1963 |

FOREIGN PATENTS

| 443,199 | Great Britain | Nov. 19, 1934 |